Figure 9:
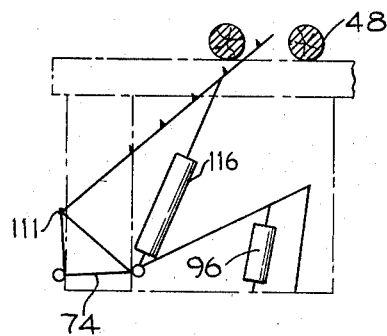

Oct. 28, 1958    C. A. BAKER    2,857,941
LOG HANDLING APPARATUS
Filed Dec. 31, 1956    4 Sheets-Sheet 1
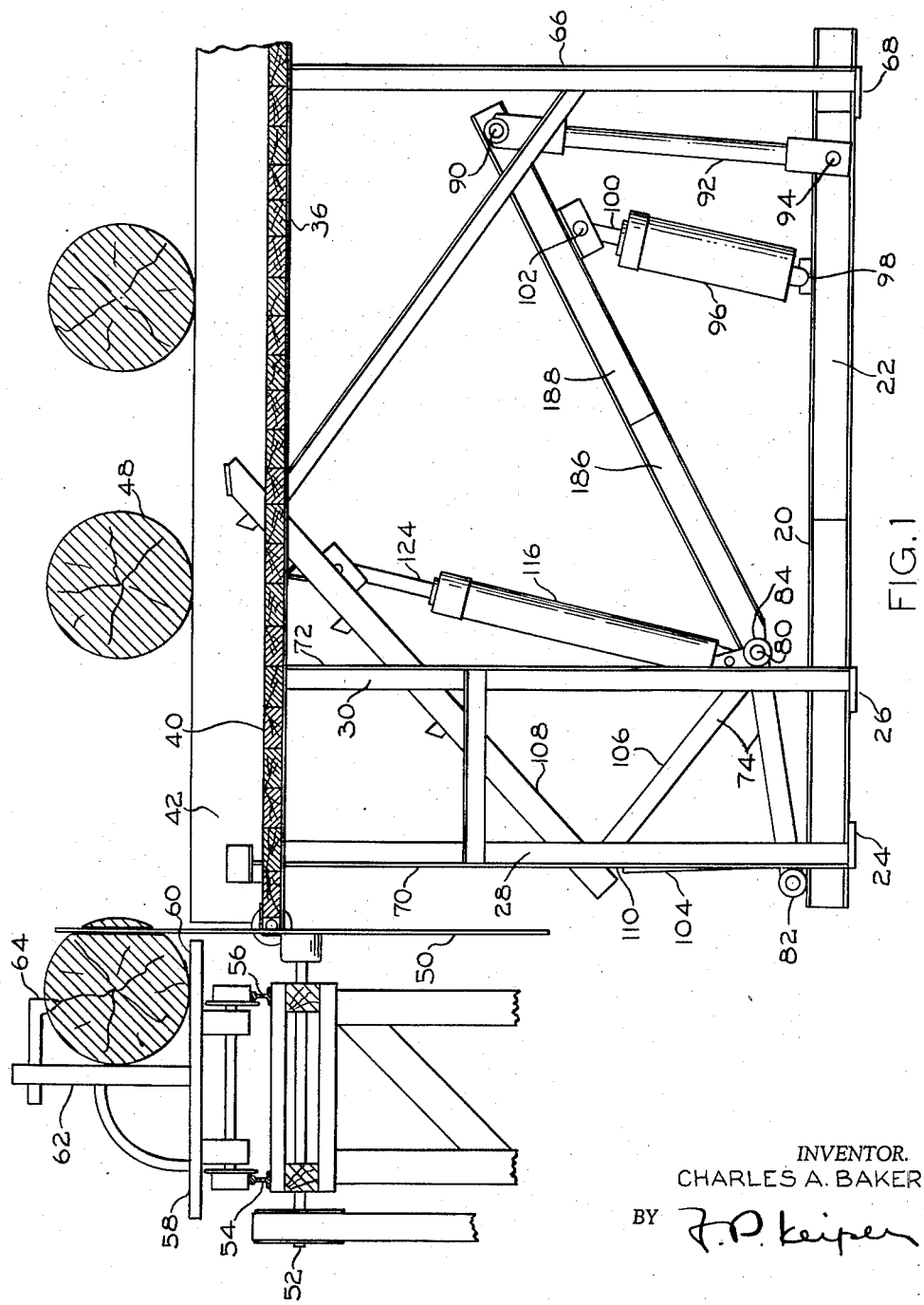
INVENTOR.
CHARLES A. BAKER
BY F. P. Keiper Oct. 28, 1958  C. A. BAKER  2,857,941
LOG HANDLING APPARATUS Filed Dec. 31, 1956  4 Sheets-Sheet 2

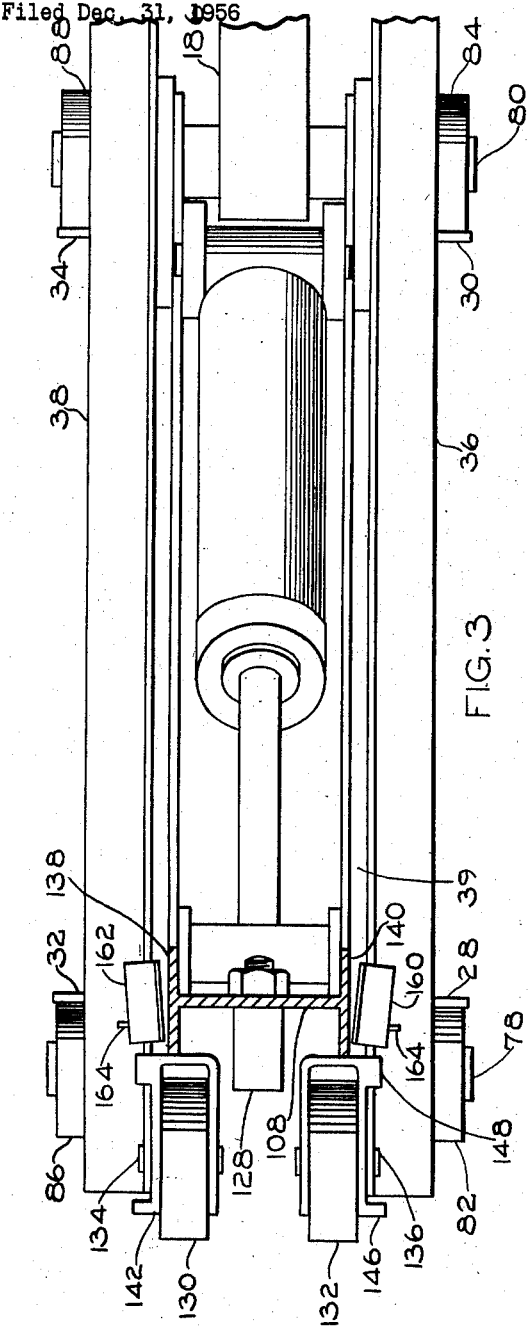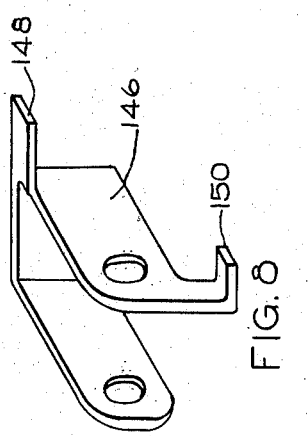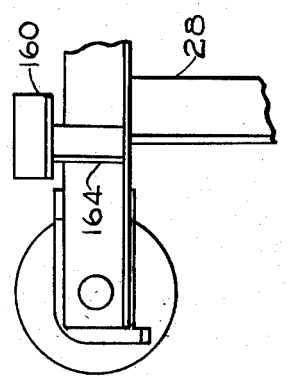

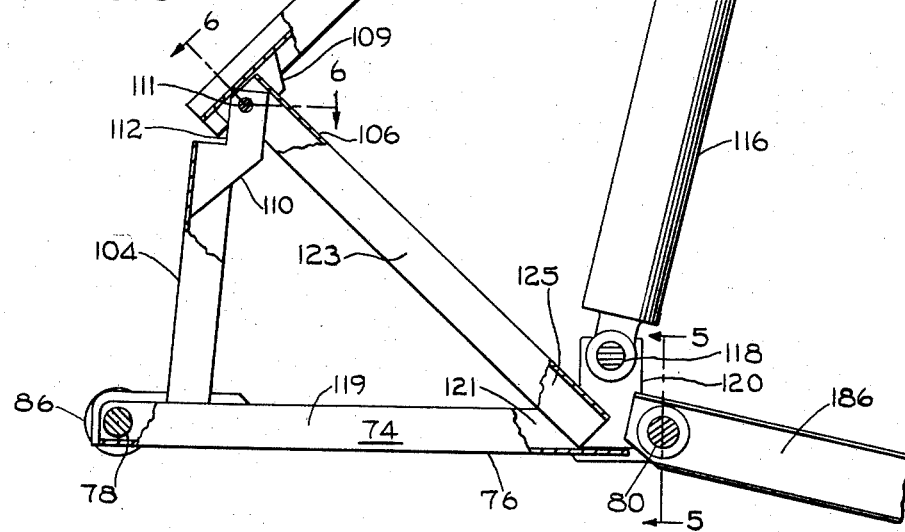

United States Patent Office 2,857,941
Patented Oct. 28, 1958

2,857,941

LOG HANDLING APPARATUS

Charles A. Baker, Canisteo, N. Y.

Application December 31, 1956, Serial No. 631,914

11 Claims. (Cl. 143—99)

This invention relates to sawmill log handling apparatus, and more particularly to power mechanism for advancing logs toward the sawmill carriage, and for turning logs thereon.

More particularly, the invention has to do with movement of heavy logs on ways leading to the saw carriage, and the turning of logs mounted on the saw carriage. The invention comprises a nigger bar which is pivotally mounted at its lower end on an elevatable carriage, and in which power operation over the pivotal movement of the bar, and power operation for the elevation of the carriage is provided. The invention further has to do with providing rocking movement of the carriage, independent of said power applications so as to provide for yielding of the nigger bar as may be required, for example, in turning a squared, or partially squared log on the saw carriage. The invention further is directed to automatic mechanism for protecting logs from scarring in the log turning operation.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 10:
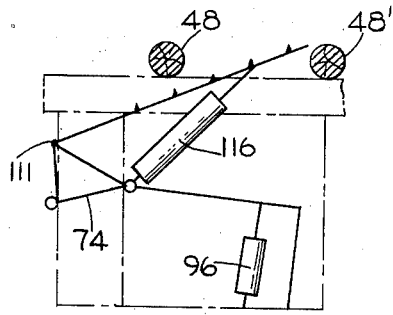
Figure 11:
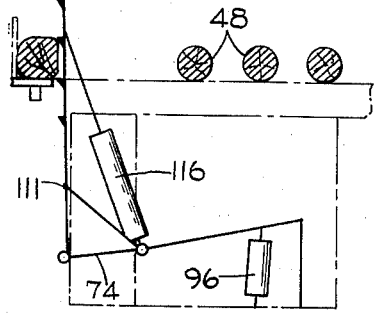
Figure 2:
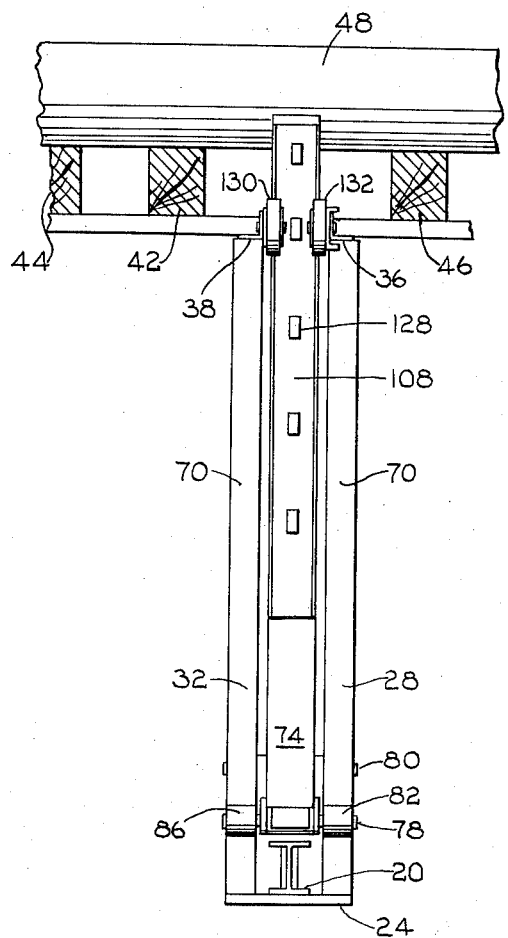

In the drawings, wherein like reference characters indicate like parts:

Figure 1 is a side elevational view of the log turner;
Figure 2 is an end elevational view;
Figure 3 is a top plan view;
Figure 4 is a sectional view of the log nigger carriage;
Figure 5 is a fragmentary sectional view taken substantially on the line 5—5 of Figure 4;
Figure 6 is a detailed sectional view taken substantially on the line 6—6 of Figure 4;
Figure 7 is a fragmentary side elevational view of the upper left hand end of the frame;
Figure 8 is a perspective view of the U-shaped roller cam spacer;
Figure 9, Figure 10 and Figure 11 are schematic diagrams showing the log roller in different positions.

Referring to the drawings and in particular to Figures 1, 2 and 3, there is shown a frame comprising a base I beam 20 stiffened as at 22 by additional side plates. At one end of the I beam 20 are positioned transverse plates 24 and 26 from which rises a vertical carriage trackway composed of angle irons 28, 30, 32 and 34. At their upper ends the angle irons abut and are secured to horizontally disposed spaced angle irons 36 and 38 located at the floor level of the sawmill. The angle irons 36 and 38 define an elongated slot 39 in the floor 40. The sawmill floor is provided with heavy stringers or ways such as 42, 44 and 46 for the support of logs such as 48 which are unloaded thereon preparatory to being fed to the sawmill carriage. The floor terminates substantially at the plane of the saw which is indicated at 50, the saw rotating on an axis indicated at 52 that is located forward of the frame as shown in Figure 1. The usual sawmill carriage trackways 54 and 56, having a carriage 58 thereon is provided, such carriage having log supporting rails 60 on a level with the stringers 42, 44 and 46. The carriage is provided with sliding dog supports 62 having toothed dogs 64 for gripping a log during each cutting operation. The angle irons 36 and 38 are supported at their other end upon columns 66 extending from a transverse member 68 secured to the main beam 20.

The angle irons 28, 30, 32 and 34 are disposed so as to provide track faces 70 and 72 for an elevatable roller carriage 74. The roller carriage comprises a heavy channel member 76 having at its ends, shafts 78 and 80 upon which are journalled rollers 82 and 86, and 84 and 88 respectively. The length of the channel member 76 and the spacing between the rollers 82 and 86 on the one hand and 84 and 88 on the other, is such as to permit the carriage 74 to assume an inclined position as is indicated, for example, in Figure 1.

The carriage 74 is raised or lowered by means of a boom 186 in the form of an I beam strengthened as at 188, one end of the boom being pivoted upon the carriage shaft 80, and the other end being pivotally connected as at 90, to a tension link 92 which link is in turn pivoted upon the frame member 20 as at 94. A hydraulic cylinder 96 pivotally rests upon the frame member 20 as at 98 and is provided with a piston rod 100 pivoted to the boom 186 as at 102, so that the carriage 74 may be raised or lowered at will by the hydraulic operation of the double acting cylinder 96 in raising or lowering the boom 186.

The carriage 74 is provided with a triangular frame comprising a substantially upright channel member 104 and a diagonal channel member 106, said members being rigidly secured to the channel member 76. The channel member 106 extends above the upper end of the channel member 104 and has pivotally mounted thereon as at 111 at its upper end, a log nigger bar in the form of an I beam 108, such nigger bar extending upwardly from the carriage through the elongated slot 39 in the sawmill floor between the angle irons 36 and 38. The I beam 108 is provided with plates 109 secured thereto for receiving the ends of the pivot pin 111. The channel member 104 is provided with an extension member 110 which rigidly connects the channels 106 and 104. The extension member 110 is notched as at 112 to engage the web 114 of the nigger bar 108 so as to act as a stop to limit the pivotal motion of the nigger bar when it has been rotated counter-clockwise on pivot 111 substantially into a vertical position and in alignment with the channel member 104. A second hydraulic cylinder 116 for actuating the nigger bar is pivotally mounted at its lower end as at 118 between plates 120 and 122 which lie between the side flanges 119 and 121 of the channel member 76 and the side flanges 123 and 125 of the channel member 106. The piston rod 124 of the cylinder 116 is pivotally connected to the nigger bar towards its upper end as is indicated at 126. The nigger bar is provided on the side facing the sawmill carriage with a plurality of pointed dogs 128 spaced about nine inches apart which are adapted to engage a log to be moved or to be rolled upon the ways and upon the sawmill carriage.

The angle irons defining the channel in the sawmill floor at the ends adjacent the sawmill carriage are each provided with a pair of spaced rollers 130 and 132 pivoted on stub shafts 134 and 136. The rollers are adapted to engage the flanges 138 and 140 of the nigger bar 108 when swung to a substantially vertical position for rolling a log on the sawmill carriage. Embracing each of the rollers 130 and 132 are U cam spacer members 142 and 146 which are freely pivoted on the stub shafts 134 and 136. Such U cam members are provided with stops 148 and 150 which are adapted to engage the respective angle irons 36 and 38 in order to limit the angular movement of the U cam members to about 90° of movement between a position where such members extend substantially vertically and a position where such members extend substantially horizontally. The U members when rotated to the horizontal position space the nigger bar from the log on the carriage so as to prevent the dogs 128 on downward movement of the nigger bar from engaging or gouging unnecessarily a log positioned on the carriage. It will be appreciated that after each saw cut, the plane of the cut surface of the remaining log will always lie in the same plane, so that the position of the rollers 130 and 132 is such as to permit the nigger bar to engage the log, but prevent movement closer to the carriage than is otherwise necessary for log turning engagement.

It will be seen that upon upward movement of the nigger bar, resulting from raising carriage 74 by actuation of the cylinder 96, that such bar may roll with its flanges 138 and 140 upon rollers 130 and 132, the nigger bar extending substantially vertical at such time, but inclined slightly toward the sawmill carriage.

Assuming a log is to be turned which is resting upon the sawmill carriage, one or more of the dogs 128 will engage the log and upon upward movement of the nigger bar the face or lower corner of the log so engaged will be elevated and the log caused to rotate upon the carriage rails 60. Upon turning the log and subsequent lowering of the nigger bar for a new grip upon the log if required, the U cam members will rotate into the horizontal position shown for example in Figure 3, so as to cause the nigger bar to be spaced from the log to thereby prevent the dogs from scarring the log. Upon return upward movement of the nigger bar, the U members are promptly rotated upwardly to the vertical position and out of the way so that the nigger bar flanges 138 and 140 ride upon the rollers 130 and 132 to thereby permit the nigger bar dogs to engage the log on the sawmill carriage.

In rotating a log upon the sawmill carriage, as for example, a log which has been squared on two or more sides, the rotation of the log will require that the nigger bar yield laterally in a direction away from the sawmill carriage by reason of the diagonal dimension of the log. Such lateral yield is at once permitted by the rocking of the carriage 74 from the position inclined at the angle as is indicated in Figure 1 to a position of reverse inclination, the rollers 82 and 86 being allowed to rise relative to the rollers 84 and 88, thereby permitting the nigger bar to yield as necessary in a direction away from the sawmill carriage during the rolling of the log. This lateral yielding movement is permitted without varying the position of the piston rod 124 in the cylinder 116, the carriage 74 and nigger bar remaining substantially rigid during the operation. The actual rolling operation is effected by introducing hydraulic fluid into the cylinder 96 to elevate the carriage 74 and nigger bar as a rigid assembly.

In Figure 9 there is shown a schematic diagram showing the bar in a position for rolling a log along the stringers toward the sawmill carriage, rolling being effected by energizing the cylinder 116 to rock the nigger bar counter-clockwise on its pivot 111 from the position shown in Figure 9. In Figure 10 the carriage is shown elevated to a medium high position with the nigger bar extending rearwardly toward its maximum reach along the ways 42 and 46 to feed a log remotely located along the ways towards the sawmill carriage. By lowering the carriage 74, and lowering the nigger bar 108 to a more nearly horizontal position, the tip end of the bar can be brought under a log such as 48', and by combined actuation of cylinders 96 and 116, the log can be advanced toward the sawmill carriage.

In Figure 11 the nigger bar is shown in approximate position for rolling a log located on the sawmill carriage, which operation is effected by energization of the power cylinder 96, to elevate the carriage 76 and the nigger bar as a relatively rigid unit. As the log rolls counter clockwise the nigger bar is permitted to yield backwardly to compensate for increased width along the diagonal dimension of the log by reason of the permitted rocking of the carriage 74 from the inclined position shown in Figures 1 and 11, towards a position of reverse inclination.

Angle iron braces extend between the members 36 and 38, and spaced uprights 66, and are so disposed as to provide guides for the nigger bar with inside surfaces flush with the inside faces of members 36 and 38, so that should the upper end of the nigger bar be swung from the position shown in Figure 1, to a position below the angle members 36 and 38, braces will act to guide the bar on upward movement of its end into the slot 39. Guides in the form of short inclined angle members 160 and 162 mounted on angle iron supports 164 secured to the respective angle irons 36 and 38, provide for alignment of the nigger bar 108, so that its flanges engage the rollers 130 and 132.

It will be seen from the foregoing description, that by skillful manual operation of the admission of hydraulic fluid under pressure to the cylinders 96 and 116, logs may be brought along the stringers 42, 44 and 46 into readiness for placing on the sawmill carriage, can be placed upon the carriage and thereafter turned when on the sawmill carriage.

A suitable source of hydraulic fluid under pressure with manually operable, conveniently located control valves for controlling admission and return of fluid to and from the opposite ends of the cylinders, with flexible hose connections to the opposite ends of the cylinders will be provided as will be readily understood in the art. Pressure limiting valves may also be provided as appear desirable.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A log handling device for sawmills comprising, a vertical column comprising opposed laterally spaced vertical trackways, a substantially horizontally disposed carriage extending between said trackways and having rollers spaced slightly in excess of the spacing of said trackways and adapted to engage said trackways, whereby said carriage may have limited movement to incline in either direction from the horizontal, a nigger bar pivotally mounted towards one end of said carriage and extending generally upward therefrom, hydraulic means extending from the other end of said carriage to said nigger bar for varying the angle of said bar in respect to the carriage, and means for raising and lowering said carriage operating on the said other end thereof.

2. A log handling device for sawmills comprising a vertical trackway, a substantially horizontally extending carriage mounted for vertical movement thereon, means adapted to elevate said carriage, means providing for angular movement of said carriage from the horizontal, a nigger bar pivotally mounted upon and extending upward from said carriage, and power means extending from said carriage to said bar for varying the angle between said bar and carriage.

3. A log handling device for sawmills comprising a vertical trackway, a substantially horizontally extending carriage mounted for vertical movement thereon, means adapted to elevate said carriage, means providing for angular movement of said carriage from the horizontal, a nigger bar pivotally mounted upon and extending upward from said carriage, power means extending from said carriage to said bar for varying the angle between said bar and carriage, a guideway extending horizontally at the upper end of said trackway through which the upper end of said bar extends, roller guides at one end of said guideway located substantially above the pivotal mount of said bar on the carriage and adapted to engage said bar and limit its angular movement to a position slightly beyond the vertical, and cam means adapted to enshroud said rollers to provide a limit within the limit position established by said roller guides, upon downward movement of said bar on said rollers.

4. A log handling device for sawmills comprising a vertical trackway, a substantially horizontally extending carriage mounted for vertical movement thereon, means adapted to elevate said carriage, means providing for angular movement of said carriage from the horizontal, a nigger bar pivotally mounted upon and extending upward from said carriage, power means extending from said carriage to said bar for varying the angle between said bar and carriage, a guideway extending horizontally at the upper end of said trackway through which the upper end of said bar extends, a saw carriage and track extending transversely of said guideway adjacent one end thereof, a saw laterally disposed from the guideway, and establishing a vertical cutting plane between said saw carriage track and vertical trackway, limiting means associated with the end of said guideway for engaging said bar when in a substantially vertical position adjacent said cutting plane, to limit movement of said bar toward said saw carriage, said limiting means including means for establishing a limit for said bar short of the cutting plane on downward movement thereof, and beyond the cutting plane on upward movement thereof.

5. A log handling device for sawmills comprising, a vertical column comprising opposed laterally spaced vertical trackways, a substantially horizontally disposed carriage extending between said trackways and having rollers spaced slightly in excess of the spacing of said trackways and adapted to engage said trackways, whereby said carriage may have limited movement to incline in either direction from the horizontal, a nigger bar pivotally mounted towards one end of said carriage and extending generally upward therefrom, hydraulic means extending from the other end of said carriage to one side of said nigger bar for varying the angle of said bar in respect to the carriage, log engaging dogs mounted on the other side of said bar, and means for raising and lowering said carriage operating on the said other end thereof.

6. A log handling device for sawmills comprising a vertical trackway, a substantially horizontally extending carriage mounted for vertical movement thereon, means adapted to elevate said carriage, means providing for angular movement of said carriage from the horizontal, a nigger bar pivotally mounted upon and extending upward from said carriage, power means extending from said carriage to said bar on one side thereof for varying the angle between said bar and carriage, and log engaging dogs on said bar on the other side thereof.

7. A log handling device for sawmills comprising vertical guide means, a carriage mounted for vertical and rocking movement thereon, means pivotally attached to said carriage and adapted to elevate said carriage, a nigger bar pivotally mounted upon and extending upward from said carriage, and means extending from said carriage to said bar for establishing a fixed angular relation between said bar and carriage.

8. A log handling device for sawmills comprising vertical guide means, a carriage mounted for vertical and rocking movement thereon, means pivotally attached to said carriage and adapted to elevate said carriage, a nigger bar pivotally mounted upon and extending upward from said carriage, and a power actuated extensible and retractable brace extending between said carriage and bar.

9. A log handling device for sawmills comprising, a vertical column comprising a vertical guide, carriage means mounted for vertical and limited rocking movement on said guide, a nigger bar pivotally mounted on said carriage and extending generally upward therefrom, hydraulic extensible brace means extending from the other end of said carriage to said nigger bar for varying the angle of said bar in respect to the carriage, and hydraulically actuated means for raising and lowering said carriage pivotally attached to said carriage at a point laterally spaced from said pivotally mounted bar.

10. A log handling device for sawmills comprising a vertical trackway, a substantially horizontally extending carriage mounted for vertical movement thereon, means adapted to elevate said carriage, means providing for angular movement of said carriage from the horizontal, a nigger bar pivotally mounted upon and extending upward from said carriage, power means extending from said carriage to one side of said bar for varying the angle between said bar and carriage, log engaging dogs on the other side of said bar all projecting a uniform height from the bar, a guideway extending horizontally at the upper end of said trackway through which the upper end of said bar extends, roller guides at one end of said guideway located substantially above the pivotal mount of said bar on the carriage and adapted to engage said bar and limit its angular movement to a position approximately vertical, and cam means pivotally mounted coaxially of said roller guides and adapted to enshroud said rollers to provide a second limit within the limit position established by said roller guides, upon downward movement of said bar on said rollers, said second limit being spaced from the first limit by the approximate height of said dogs.

11. A log handling device for sawmills comprising vertical guide means, a carriage mounted for vertical and rocking movement thereon, means adapted to elevate said carriage, a nigger bar pivotally mounted upon and extending upward from said carriage, extensible power means extending from said carriage to said bar for varying the angle between said bar and carriage, a guideway extending horizontally at the upper end of said guide means through which the upper end of said bar extends, a saw carriage and track extending transversely of said guideway adjacent one end thereof, a saw laterally disposed from the guideway, and establishing a vertical cutting plane between said saw carriage track and vertical guide means, limiting means associated with the end of said guideway for engaging said bar when in a substantially vertical position adjacent said cutting plane, to limit movement of said bar toward said saw carriage, log engaging dogs on said bar adapted to extend into said plane when said bar reaches said limit, said limiting means including means for establishing a limit for said bar and said dogs short of the cutting plane on downward movement thereof.

References Cited in the file of this patent

UNITED STATES PATENTS

| | | |
|---|---|---|
| 448,662 | Mills et al. | Mar. 24, 1891 |
| 576,663 | Evered | Feb. 9, 1897 |